(12) United States Patent
Ireland et al.

(10) Patent No.: US 8,992,081 B2
(45) Date of Patent: Mar. 31, 2015

(54) HIGH TEMPERATURE MEASUREMENT PROBE

(75) Inventors: Peter Ireland, Derby (GB); Andrew Wilson, Derby (GB); Steven Thorpe, Sileby (GB); Damian Martin, Nottingham (GB)

(73) Assignee: Rolls-Royce PLC, London (GB)

( * ) Notice: Subject to any disclaimer, the term of this patent is extended or adjusted under 35 U.S.C. 154(b) by 246 days.

(21) Appl. No.: 13/161,899

(22) Filed: Jun. 16, 2011

(65) Prior Publication Data

US 2011/0317740 A1    Dec. 29, 2011

(30) Foreign Application Priority Data

Jun. 29, 2010 (GB) .................................. 1010862.9

(51) Int. Cl.
| | |
|---|---|
| G01K 7/02 | (2006.01) |
| G01K 1/14 | (2006.01) |
| G01K 1/08 | (2006.01) |
| G01K 13/02 | (2006.01) |

(52) U.S. Cl.
CPC .............. G01K 13/02 (2013.01); G01K 13/028 (2013.01)
USPC ........... 374/179; 374/208; 374/148; 374/144; 374/145

(58) Field of Classification Search
CPC ........... G01K 7/02; G01K 1/14; G01K 13/02; G01K 1/08
USPC ........................... 374/148, 208, 179, 144, 145
See application file for complete search history.

(56) References Cited

U.S. PATENT DOCUMENTS

| | | | | | |
|---|---|---|---|---|---|
| 2,496,806 | A | * | 2/1950 | Moffatt | 136/224 |
| 2,930,827 | A | * | 3/1960 | Schunke | 136/224 |
| 2,971,997 | A | * | 2/1961 | Carrico | 136/231 |
| 3,011,004 | A | * | 11/1961 | Meador | 136/231 |
| 3,077,505 | A | * | 2/1963 | Eshaya | 136/228 |
| 3,181,363 | A | * | 5/1965 | Edmonson | 374/134 |
| 3,423,610 | A | * | 1/1969 | Rhoads et al. | 310/11 |

(Continued)

FOREIGN PATENT DOCUMENTS

FR    2 771 505 A1    5/1999
JP    56114732 A  *  9/1981

(Continued)

OTHER PUBLICATIONS

Translation of JP 2002-310806, Oct. 23, 2002.*

(Continued)

*Primary Examiner* — Mirellys Jagan
(74) *Attorney, Agent, or Firm* — Oliff PLC

(57) ABSTRACT

A high temperature measurement probe comprises an elongate probe body having a measuring head which in use is located in a hot fluid flow. The probe further comprises a thermocouple extending along the interior of the probe body to terminate at a temperature-sensing thermocouple junction inside the measuring head. The probe body has internal passages for circulation of a coolant fluid therein. The measuring head contains a channel, one end of the channel forming an inlet for receiving hot fluid from the hot fluid flow and another end of the channel forming an outlet for discharging the hot fluid received at the inlet. Between the inlet and the outlet a section of the channel extends along the length direction of the probe body. The thermocouple runs along the section of the channel with the thermocouple junction proximate the upstream end of the section.

6 Claims, 4 Drawing Sheets

(56) References Cited

U.S. PATENT DOCUMENTS

| | | | |
|---|---|---|---|
| 3,451,268 A | | 6/1969 | Meador |
| 3,527,620 A | * | 9/1970 | Meador ............... 136/201 |
| 3,577,784 A | * | 5/1971 | Kovacic ............... 374/125 |
| 3,596,518 A | * | 8/1971 | Kirkpatrick ............... 374/134 |
| 3,747,408 A | * | 7/1973 | Stanworth et al. ............... 374/125 |
| 3,940,988 A | | 3/1976 | Reed |
| 4,215,565 A | * | 8/1980 | Zanker ............... 73/30.01 |
| 4,480,930 A | | 11/1984 | DeZubay et al. |
| 5,718,512 A | * | 2/1998 | Ngo-Beelmann ............... 374/148 |
| 7,111,982 B1 | * | 9/2006 | Swonger, Jr. ............... 374/143 |
| 2004/0134282 A1 | * | 7/2004 | Hayashi et al. ............... 73/708 |
| 2008/0302081 A1 | * | 12/2008 | Snell et al. ............... 60/39.093 |
| 2009/0154522 A1 | * | 6/2009 | Kulczyk ............... 374/138 |
| 2010/0158074 A1 | | 6/2010 | Fortier et al. |

FOREIGN PATENT DOCUMENTS

| | | | |
|---|---|---|---|
| JP | 58198734 A | * | 11/1983 |
| JP | 61091532 A | * | 5/1986 |
| JP | A-2002-310806 | | 10/2002 |

OTHER PUBLICATIONS

British Search Report for priority British Patent Application No. 1010862.9, dated Nov. 11, 2010.

Mar. 25, 2014 Search Report issued in European Patent Application No. 11 17 0177.

* cited by examiner

HIGH TEMPERATURE MEASUREMENT PROBE

BRIEF SUMMARY OF THE INVENTION

The present invention relates to a high temperature measurement probe.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Measurements of total gas temperature (i.e. stagnation temperature) are needed for performance analysis of gas turbine engine. However, obtaining temperature measurements from particularly the high and intermediate-pressure turbines can be problematic due to the high working gas temperatures in these parts of the engine. One approach is to insert a radial traverse probe into the engine, the probe carrying a thermocouple for measuring the total gas temperature. To protect the probe from the high working gas temperatures, coolant can be circulated within the probe. However, as such cooling can lead to error in the thermocouple's temperature measurement, a problem then arises of ensuring that the temperature-sensing junction of the thermocouple, and the working gas to which the temperature-sensing junction is exposed, are not excessively cooled by the coolant.

Accordingly, a first aspect of the present invention provides a high temperature measurement probe comprising:
 an elongate probe body having a measuring head which in use is located in a hot fluid flow, and
 a thermocouple extending along the interior of the probe body to terminate at a temperature-sensing thermocouple junction inside the measuring head;
 wherein:
 the probe body has internal passages for circulation of a coolant fluid therein,
 the measuring head contains a channel, one end of the channel forming an inlet for receiving hot fluid from the hot fluid flow and another end of the channel forming an outlet for discharging the hot fluid received at the inlet, between the inlet and the outlet a section of the channel extending along the length direction of the probe body, and
 wherein the thermocouple runs along the section of the channel with the thermocouple junction proximate the upstream end of the section.

By providing a section of channel extending along the length direction of the probe body and having the thermocouple run along that section of channel, a relatively long portion of the thermocouple ending in the thermocouple junction can be exposed to the fluid flow. This helps to move thermal gradients in the thermocouple caused by the coolant away from the thermocouple junction, and therefore improves the accuracy of the temperature measurement made by the thermocouple.

The probe may have any one or, to the extent that they are compatible, any combination of the following optional features.

Conveniently, the coolant can be a liquid coolant such as water.

Typically, the probe body is aligned transversely to the mainstream direction of the hot fluid flow. For example, such an alignment is adopted when the probe is used as a radial traverse probe in a gas turbine engine.

Preferably, the ratio of the length of the portion of the thermocouple which runs along the section of the channel to the diameter of the thermocouple is in the range from about 4 to 10, more preferably from about 6 to 8. If the ratio is too large, the portion of the thermocouple which runs along the section of the channel may have insufficient mechanical support. If the ratio is too low, the thermal gradients in the thermocouple caused by the coolant may not be moved far enough away from the thermocouple junction.

Preferably, the ratio of the channel diameter to the thermocouple diameter is in the range from about 2 to 4, more preferably about 3. If the ratio is too large, the probe may have an unnecessarily large impact on the external flow. If the ratio is too low, those parts of the channel not occupied by the thermocouple may provide an insufficient flow cross-section for the hot fluid received through the inlet.

Typically, the inlet and outlet are on opposite sides of the probe body. In this way, with the inlet facing upstream relative to the mainstream direction of the hot fluid flow, the fluid discharging at the outlet is returned to the hot flow on the downstream side of the probe body.

Preferably, the channel has a dogleg at the upstream end of the section of the channel to turn the channel into the section. Preferably, the channel forms a further dogleg downstream of the first dogleg to turn the channel out of the section. Having two doglegs allows the inlet and outlet to be on opposite sides of the probe body and also to be located only a relatively short distance apart in the length direction of the probe body. The size of the measuring head can then be reduced.

Typically the measuring head is at an end of the probe body. In such an arrangement, the inlet is preferably closer to that end of the probe body than the outlet.

Preferably, between the inlet and the section of the channel, the channel is alignable with the mainstream direction of the hot fluid flow, e.g. by rotating the probe about the axis of the probe body. This allows the flow conditions in the channel to be readily characterised, such that, for example, flow velocities and pressures in the channel can be predicted and used to extrapolate the total gas temperature in the flow outside the measuring head from the temperature measurement made by the thermocouple.

The channel may be adaptable to vary the rate of flow of the hot fluid therethrough. For example, the outlet may be formed as an opening in a removably replaceable plug member located in the channel. Different plug members with different sized openings can then be used to vary the flow rate.

Preferably the probe further comprises one or more pressure tappings for measuring pressure in the hot fluid flow. For example, the probe may have a tapping that opens to a position on the probe body which faces upstream relative to the mainstream direction of the hot fluid flow for measuring the total pressure of the flow. Alternatively or additionally, the probe may have two tappings that open to respective positions on opposite sides of the probe body. These positions can face perpendicularly relative to the mainstream direction of the hot fluid flow. These tappings can then measure the static pressure in the flow and the yaw angle of the flow.

Preferably, the probe is for measuring the temperature of the working gas in a gas turbine engine. In particular, the probe can be for measuring the temperature of the turbine section of the gas turbine engine. Such probes can be used in the development phase of an engine in order to analyse engine performance. Preferably the probe is adapted to be slidable along the radial direction of the engine, such that the measuring head can be positioned at different radial locations in the engine. However, the probe can also be used in other situations where high temperature measurements are required.

The probe body may have a diameter in the range from about 20 to 40 mm. In gas turbine applications, such a diameter can provide sufficient mechanical strength for a relatively long probe body, while also accommodating the internal passages for the coolant, the thermocouple and the optional tappings. The channel may have a diameter in the range from about 2 to 10 mm. This can allow the channel to accommodate the thermocouple, which typically has a diameter of about 1 to 2.5 mm.

A second aspect of the present invention provides a gas turbine engine having one or more high temperature probes according to the first aspect.

A third aspect of the present invention provides the use of a high temperature probe according to the first aspect for measuring the temperature of a working gas in a gas turbine engine.

Embodiments of the invention will now be described by way of example with reference to the accompanying drawings in which:

DETAILED DESCRIPTION OF THE INVENTION

DETAILED DESCRIPTION OF THE INVENTION

Figure 1:
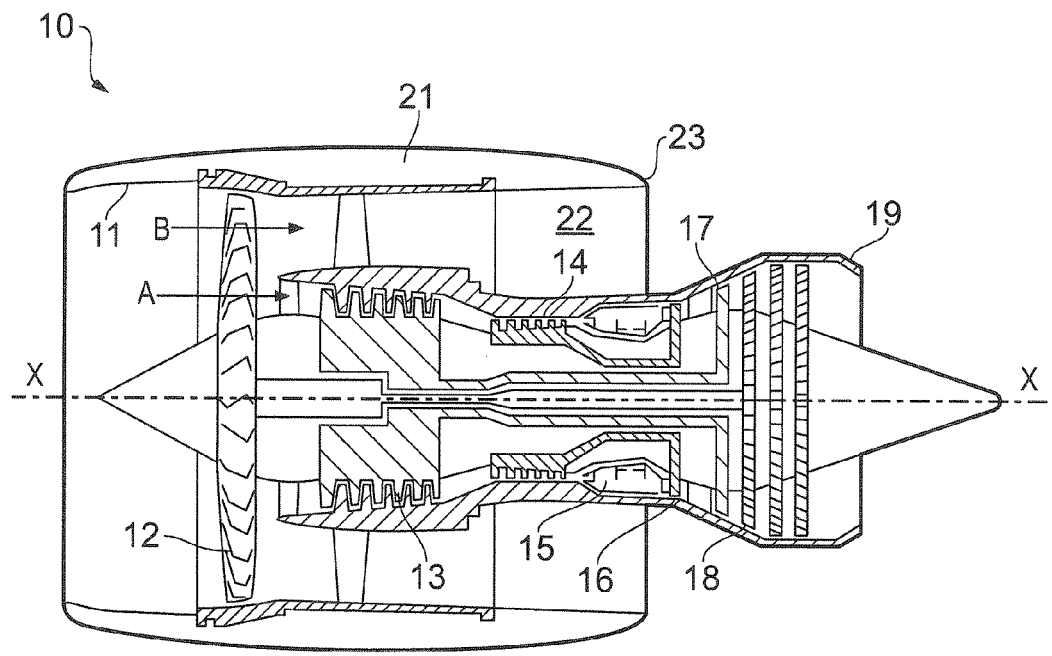
FIG. 1 shows schematically a longitudinal cross-section through a ducted fan gas turbine engine.
Figure 2:
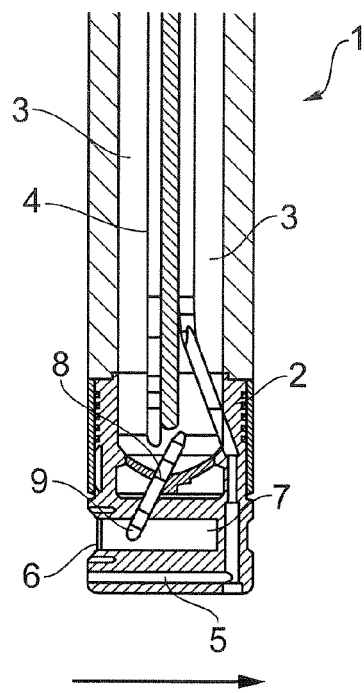
FIG. 2 shows schematically a longitudinal cross-section through the end of an earlier version of a radial traverse probe.

FIG. 2 shows schematically a longitudinal cross-section through the end of an earlier version of a radial traverse probe. Such probes can be used to measure high and intermediate-pressure turbine exit conditions. The mainstream direction of the working gas flow is indicated by an arrow in FIG. 2.

The probe has an elongate body 1 formed of appropriate alloy, with a measurement head 2 which is threadingly attached to the rest of the body. The probe is water cooled for thermal protection in high temperature gas streams of about 1500 K, the coolant circulating along the probe body 1 via inlet and outlet cooling passages 3. The body has two pressure tappings 4 (only one shown in FIG. 2) which open at opposite sides of the measurement head to face perpendicularly relative to the mainstream direction. These tappings allow the static pressure and yaw of the working gas flow to be measured. A further tapping 5 opens to the front side of the measurement head and enables the total pressure of the working gas flow to be measured.

The total gas temperature is measured by venting some of the working gas flow through an inlet 6 of a channel 7 that is located on the front side of the measurement head 2 above the opening of the pressure tapping 5. The channel extends rearwardly through the measurement head, bifurcating around the tapping 5 to form two outlets at the rear side of the measurement head. A thermocouple 8 is fed down one of the cooling passages 3, and penetrates the measurement head to terminate with its temperature-sensing thermocouple junction 9 proximate the inlet and close to the centre line of the channel.

Figure 3:
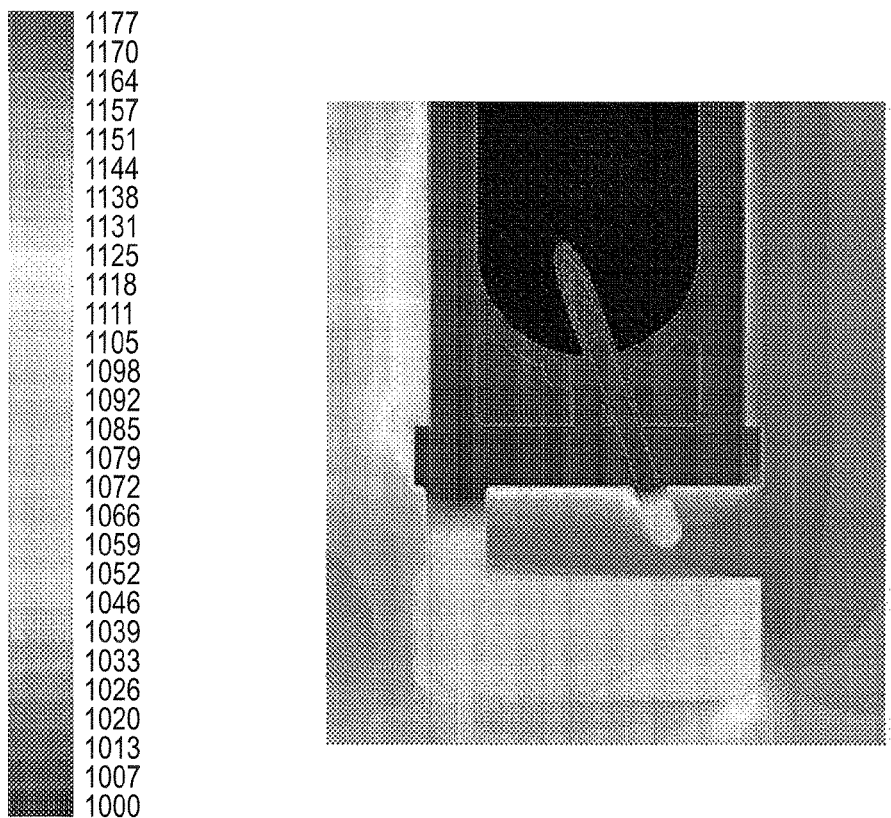
FIG. 3 shows static temperature modelling results on a longitudinal cross-section through the end of the radial traverse probe of FIG. 2.

Although the earlier version of the radial traverse probe is reliable and provides accurate pressure measurements, analyses have shown that thermocouple 8 of the probe does not measure the correct gas temperature. FIG. 3 shows static temperature modelling results around the measurement head 2 on a longitudinal cross-section through the end of the earlier version of the radial traverse probe. The modelling demonstrates that the cooled head produces a high thermal gradient in the metal casing of the thermocouple 8 close to the thermocouple junction 9. This gradient suppresses the temperature of the junction, leading to an incorrect temperature measurement by the thermocouple.

Figure 4:
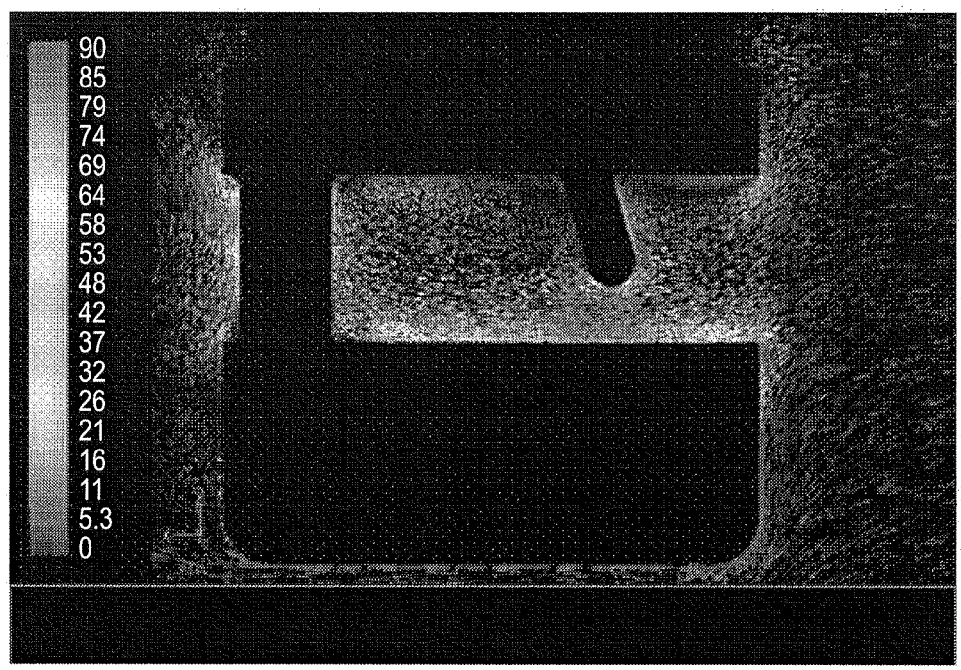
FIG. 4 shows CFD velocity vector modelling results on a longitudinal cross-section through the end of the radial traverse probe of FIG. 2.

In addition, FIG. 4 shows CFD (computational fluid dynamics) velocity vector modelling results around the measurement head 2 on a longitudinal cross-section through the end of the earlier version of the radial traverse probe. This modelling demonstrates that much of the thermocouple 8 in the channel 7 is exposed to relatively low velocity, recirculating flow, which compounds the temperature measurement error.

Figure 5:
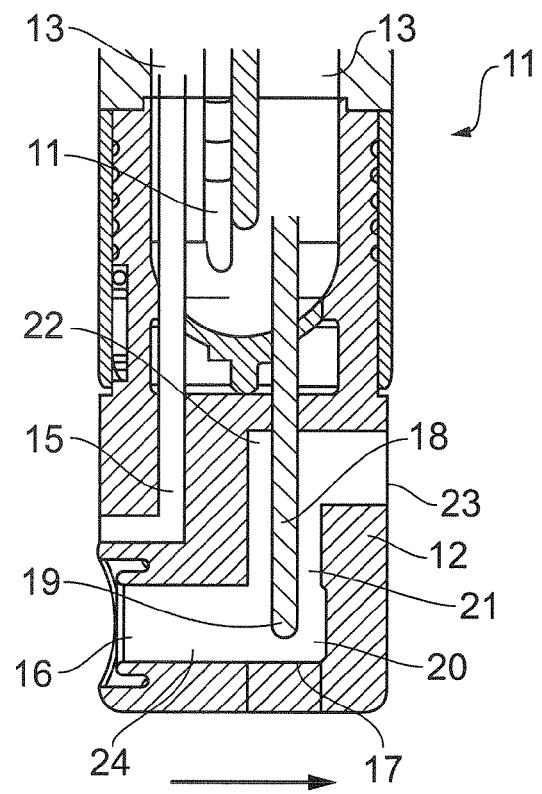
FIG. 5 shows schematically a longitudinal cross-section through the end of a radial traverse probe according to an embodiment of the present invention.

Overall, the temperature measurement error in engine tests is about 50-80 K, which is very significant when the measured data is used to assess engine performance. FIG. 5 shows schematically a longitudinal cross-section through the end of a radial traverse probe according to an embodiment of the present invention. Again, the mainstream direction of the working gas flow is indicated by an arrow. The probe has features in common with the probe shown in FIG. 2. Thus the probe has an elongate body 11 formed of appropriate material, such as nickel-based alloy, with a measurement head 12 which is threadingly attached to the rest of the body. The measurement head can be made of platinum-rhodium alloy for high temperature oxidation resistance. Water circulates along the probe body via inlet and outlet cooling passages 13. The body has two pressure tappings 14 (only one shown in FIG. 5) which open at opposite sides of the measurement head to face perpendicularly to the mainstream direction and allow the static pressure and yaw of the working gas flow to be measured. A further tapping 15 opens to the front side of the measurement head and enables the total pressure of the working gas flow to be measured.

The total gas temperature is measured by venting some of the working gas flow through an inlet 16 of a channel 17, the inlet being located on the front side of the measurement head 12 below the opening of the pressure tapping 5. The channel extends initially rearwardly through the measurement head and may be in general alignment with the direction of the main working gas flow. However, it then turns through 90° at dogleg 20, continues along the length direction of the probe to extend away from the end of the probe, turns through 90° again at another dogleg 22, and continues rearwardly to end at an outlet 23. This dogleg 22 may be in general alignment with the direction of the main working gas flow. A thermocouple 18 is fed down one of the cooling passages 3 to penetrate the channel at the second dogleg 22. The thermocouple then runs along the centre line of the section 21 of channel between the two doglegs to terminate with its thermocouple junction 19 at the first dogleg 20 and on the centre line of the section 24 of channel between the inlet and the first dogleg. Although both the channel that extends initially rearwardly and the dogleg 22 are in general alignment with the direction of the main working gas flow it should be appreciated that the localised flow directions may be different and therefore the centre-lines of the channel and dogleg may be in the general direction of that local flow direction.

Thus the measuring head contains a channel 17, one end of the channel forming an inlet 16 for receiving hot fluid from the hot fluid flow or main working gas flow and another end of the channel forming an outlet 23 for discharging the hot fluid received at the inlet and back into the main working gas flow. Between the inlet and the outlet a section 21 of the channel extends along the length direction of the probe body.

Figure 6:
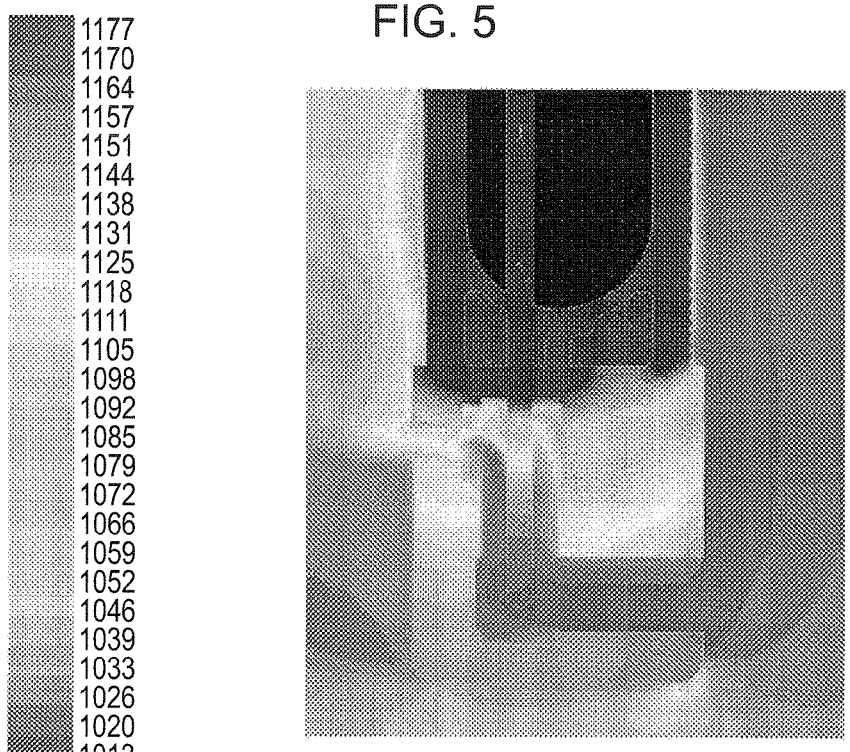
FIG. 6 shows static temperature modelling results on a longitudinal cross-section through the end of the radial traverse probe of FIG. 5.
Figure 7:
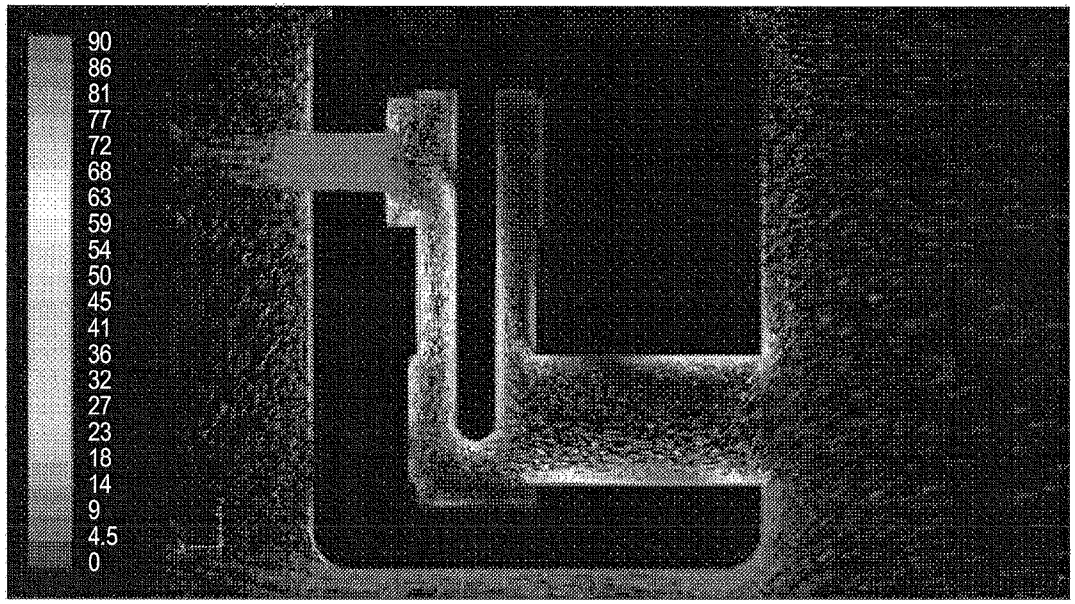
FIG. 7 shows CFD velocity vector modelling results on a longitudinal cross-section through the end of the radial traverse probe of FIG. 5.

For comparison with FIGS. 3 and 4, FIGS. 6 and 7 show respectively static temperature modelling results and CFD velocity vector modelling results around the measurement head 12 on longitudinal cross-sections through the end of the radial traverse probe of FIG. 5. FIG. 6 demonstrates that, due to the much greater length of thermocouple in the channel 17, the high thermal gradient in the metal casing of the thermocouple 18 produced by the cooled head 12 is further from the thermocouple junction 19. The gradient does not therefore suppress the temperature of the junction to such an extent, leading to a significantly reduced temperature measurement error by the thermocouple. FIG. 7 demonstrates that in section 21 of the channel, large portions of the thermocouple are exposed to relatively high velocity flow, which also helps to reduce the measurement error. In particular, the presence of the first dogleg 20 provides a highly turbulent flow with areas of high velocity and areas of high heat transfer rate in section 21 of the channel. This helps to ensure a low thermal gradient along the thermocouple towards the thermocouple junction, which reduces the measurement error.

Advantageously, by adopting a radial traverse probe according to the embodiment of the present invention, the temperature measurement error in engine tests can be reduced to about 10 K.

Figure 8:
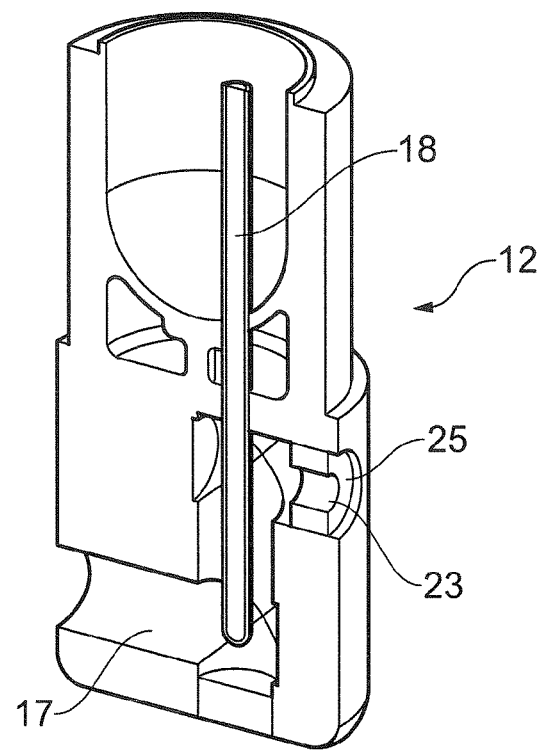
FIG. 8 shows a longitudinal cross-section through just the measurement head and thermocouple of the radial traverse probe of FIG. 5

FIG. 8 shows a longitudinal cross-section through just the measurement head 12 and thermocouple 18 of the radial traverse probe of FIG. 5. Outlet 23 can be formed by an opening in a plug member 25 inserted into the channel 17. Advantageously, this arrangement allows outlets of different diameter to be produced simply by changing the plug member. In this way, the flow rate through the channel can be varied as required. Typically, for engine testing applications, the external working gas flow may be at about Mach 0.4, while the flow through the channel may be at about Mach 0.15. Lowering the flow rate in this way reduces recovery factor uncertainty in the thermocouple measurement. The total gas temperature in the external working gas flow can be determined from the thermocouple measurement by application of a correction factor to the measurement, the relationship between the total gas temperatures in the channel and the external working gas flow being readily characterisable and consistent over a large range of working gas flow velocities.

Tests have shown that the temperature measured by the radial traverse probe according the present invention can be predictably and consistently related to external total gas temperature for yaw angles of up to about 40°. Thus even when section 24 of the channel is not aligned with the mainstream direction, it is still possible to derive total gas temperatures.

The probe according the present invention is described above in relation to total air temperature measurements in gas turbine engines. However, the probe can also be used in other fields where high temperature and possibly also high pressure measurements are required. Thus the probe could be used in aero or industrial gas turbines, reactions vessels, oil and gas extraction etc.

Advantageously, the portion of the working gas flow passing through the probe is exhausted via the outlet and back into the main working gas flow thereby returning working gas to the main flow and minimising disturbance of the main working gas flow.

The probe does not require the portion of working gas flow entering the probe to be cooled by the addition of coolant to that flow. Adding coolant to the portion of working gas flow can give erroneous temperature readings, is detrimental in terms of use of parasitic coolant as well as potentially reducing the temperature of the main working gas flow.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A high temperature measurement probe configured to measure hot fluid, the high temperature measurement probe comprising:
   an elongate probe body having a measuring head which in use is located in a hot fluid flow, and
   a thermocouple extending along the interior of the probe body to terminate at a temperature-sensing thermocouple junction inside the measuring head; wherein:
   the probe body has internal passages configured to circulate a coolant fluid therein,
   the measuring head includes a channel that has one end forming an inlet for receiving hot fluid from the hot fluid flow and another end forming an outlet for discharging the hot fluid received at the inlet, and a section of the channel is disposed between the inlet and the outlet and extending along the length direction of the probe body,
   the thermocouple is configured to run along the section of the channel such that the thermocouple junction is proximate to an upstream end of the section, and is closer to the upstream end of the section than a downstream end of the section, the channel includes a first dogleg disposed at the upstream end of the section of the channel that is configured to turn the channel into the section, the channel includes at least one additional dogleg at the downstream end of the channel that is configured to turn the channel out of the section, and the first dogleg and the at least one additional dogleg are arranged such that the inlet and the outlet are located apart in the longitudinal direction of the probe body.

2. The high temperature measurement probe according to claim 1, wherein between the inlet and said section of the channel, the channel is alignable with a mainstream direction of the hot fluid flow.

3. The high temperature measurement probe according to claim 1, wherein the channel is adaptable to vary a rate of flow of the hot fluid therethrough.

4. The high temperature measurement probe according to claim 1, further including one or more pressure tappings for measuring pressure in the hot fluid flow.

5. The high temperature measurement probe according to claim 1, which is for measuring the temperature of a working gas in a gas turbine engine.

6. A gas turbine engine having one or more high temperature measurement probes according to claim 1.

* * * * *